Patented Dec. 16, 1947

2,432,758

UNITED STATES PATENT OFFICE 2,432,758

PROCESS FOR 2-HYDROXY-3-CHLORO-TETRAHYDROPYRAN

Peter A. Hawkins, Widnes, and Nicholas Bennett, Ditton, England, assignors to Imperial Chemical Industries Limited, a corporation of Great Britain No Drawing. Application November 7, 1944, Serial No. 562,402

In Great Britain November 19, 1943

8 Claims. (Cl. 260—333)

This invention relates to the production of organic compounds and more particularly to the production of a novel chlorine-containing derivative from dihydropyran.

According to the present invention 2-hydroxy-3-chlorotetrahydropyran is produced by a process which comprises reacting dihydropyran with aqueous hypochlorous acid.

The existence of three dihydropyrans can be postulated on purely valency considerations, but so far as we are aware only one has been prepared, namely dihydro-γ-pyran. It is to be understood that in the present specification and claims references to dihydro-pyran and derivatives thereof are references to dihydro-γ-pyran and its derivatives.

By reacting dihydropyran with aqueous hypochlorous acid, addition of the elements of hypochlorous acid occurs at the double bond in the dihydropyran according to the equation

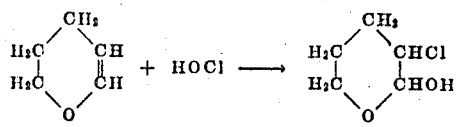

In one method of carrying out our invention an aqueous solution of hypochlorous acid, or an acid solution of an hypochlorite, is shaken vigorously with the dihydropyran at ordinary temperatures. The solution of hypochlorous acid may be produced in any convenient manner, as by treating chlorine water with mercuric oxide, by acidifying a solution of sodium or calcium hypochlorite, or by dissolving in water a compound such as chloramine which in water liberates hypochlorous acid.

A more convenient method of carrying out the invention is to emulsify the dihydropyran in water, using, if desired, a dispersing agent to facilitate the emulsification, and then to pass chlorine gradually into the emulsion. In general, however, the use of a dispersing agent is not necessary, and merely agitating the dihydropyran with water is sufficient. Hypochlorous acid is then formed in situ by the interaction of the chlorine with water, and reacts with the emulsified dihydropyran. Reaction occurs with evolution of heat, and advantageously cooling is employed to prevent the temperature rising above atmospheric. Cooling to below atmospheric temperature may also be employed if desired, for example to between 0° C. and 5° C. The product formed is soluble in water, and thus as reaction proceeds the non-aqueous phase will disappear. When, as judged by the disappearance of the non-aqueous phase, all the dihydropyran has reacted, the product may be extracted by means of a suitable solvent immiscible with water, such as ether, and isolated by evaporating the ether from the ethereal solution. Other solvents as well as ether which may be used to extract the product from the aqueous liquor are benzene, chloroform, methylene chloride, and ethyl acetate.

The following examples illustrate but do not limit the invention, all parts being parts by weight.

Example 1

92 parts of dihydropyran were emulsified in 200 parts of water by shaking the two together vigorously. Chlorine was then passed into the emulsion slowly until the separate dihydropyran phase had disappeared. 50 parts of chlorine had been passed in when this occurred. The resultant solution was extracted several times with ether, and the ether then evaporated from the extract. 99 parts of a clear, viscous, amber liquid were obtained containing 24% chlorine. The compound was crude 2-hydroxy-3-chlorotetrahydropyran.

Example 2

84 parts of dihydropyran were shaken vigorously with 200 parts of water and the mixture was cooled to 0° C. Chlorine was then passed in, and cooling was continued so that the temperature was maintained between 0° C. and 5° C. When the weight of the reaction mixture had increased by 67 parts, the introduction of chlorine was stopped. The dihydropyran phase had then disappeared. The liquor was neutralized with soda ash and extracted 6 times with 40 parts of ethyl ether. The solvent was then distilled off from the combined extracts and the residue was distilled in vacuo. 54 parts of product were obtained distilling between 95° C. and 100° C. at 2 mm. pressure and which solidified on standing. This product melted at 64° C. It did not reduce bromine water in the cold, nor did it reduce Schiff's reagent or ammoniacal silver nitrate solution; Fehling's solution was only reduced in the hot. The product was optically active, showing dextro rotation, and on heating at atmospheric pressures to boiling point it decomposed with the evolution of water and the formation of 3-chloro-5,6-dihydropyran.

We claim:

1. A process for the production of 2-hydroxy-3-chloro-tetrahydropyran which comprises reacting dihydropyran with aqueous hypochlorous acid.

2. A process for the production of 2-hydroxy-3-chloro-tetrahydropyran which comprises reacting dihydropyran with aqueous hypochlorous acid at a temperature between 0° C. and 5° C.

3. A process for the production of 2-hydroxy-3-chloro-tetrahydropyran which comprises suspending dihydropyran in water, and passing gaseous chlorine into the suspension at a temperature below atmospheric.

4. A process for the production of 2-hydroxy-3-chloro-tetrahydropyran which comprises suspending dihydropyran in water, and passing gaseous chlorine into the suspension at a temperature between 0° C. and 5° C.

5. A process according to claim 3 in which the introduction of chlorine is continued until the non-aqueous phase disappears.

6. A process according to claim 4 in which chlorine is passed into the suspension until the non-aqueous phase disappears.

7. A process for the production of 2-hydroxy-3-chloro-tetrahydropyran which comprises suspending dihydropyran in water, passing chlorine into the suspension while maintaining the reaction mixture at a temperature between 0° C. and 5° C. until the non-aqueous phase disappears, extracting the resulting aqueous liquor with a water-immiscible solvent for the 2-hydroxy-3-chlorotetrahydropyran, and recovering 2-hydroxy-3-chlorotetrahydropyran from the resulting extract.

8. A process according to claim 7 in which the said water-immiscible solvent is ethyl ether.

PETER A. HAWKINS.
NICHOLAS BENNETT.

REFERENCES CITED

The following references are of record in the file of this patent:

Bull. Soc. Chimique (5) 1, pp. 1397–1405 (1934).
Compte Rend. 198, pp. 375–6 (1934).